United States Patent [19]

Borras

[11] Patent Number: 5,133,080
[45] Date of Patent: Jul. 21, 1992

[54] REPEATER FOR A CONTROLLED RADIO SYSTEM

[75] Inventor: Jaime A. Borras, Hialeah, Fla.

[73] Assignee: Motorola, Inc., Schaumburg, Ill.

[21] Appl. No.: 773,755

[22] Filed: Oct. 10, 1991

Related U.S. Application Data

[63] Continuation of Ser. No. 278,998, Dec. 2, 1988, abandoned.

[51] Int. Cl.⁵ .............................................. H04B 7/14
[52] U.S. Cl. ......................................... 455/9; 455/15; 455/34.1
[58] Field of Search .................... 455/9, 10, 11, 15, 13, 455/18, 17, 8, 53, 54, 56, 67, 33, 34

[56] References Cited

U.S. PATENT DOCUMENTS

| | | | |
|---|---|---|---|
| 3,634,627 | 1/1972 | Velentini | 455/34 |
| 3,731,203 | 5/1973 | Lieberman | 455/9 |
| 4,056,779 | 11/1977 | Toler | 455/11 |
| 4,415,770 | 11/1983 | Kai et al. | 455/67 |
| 4,649,567 | 3/1987 | Childress | 455/34 |
| 4,677,687 | 6/1987 | Matsuo | 455/10 |
| 4,716,407 | 12/1987 | Borras et al. | 340/825.04 |
| 4,723,264 | 2/1988 | Sasuta et al. | 379/58 |
| 4,726,050 | 2/1988 | Menich et al. | 455/33 |
| 4,882,765 | 11/1989 | Maxwell et al. | 455/18 |

Primary Examiner—Reinhard J. Eisenzopf
Assistant Examiner—Lisa D. Charouel
Attorney, Agent, or Firm—Juliana Agon

[57] ABSTRACT

A repeater (30) is provided for relaying communication between a subscriber unit (24) and a central station (10) when the repeater recognizes transmission from the subscriber unit to the central station but detects a lack of response by the central station to that subscriber unit or when the repeater recognizes a transmission from a subscriber unit (26) requesting the repeater for service. The repeater asks the central station for a channel upon which to communicate. Alternately, a predetermined channel may be used for the relayed communication.

10 Claims, 7 Drawing Sheets

REPEATER FOR A CONTROLLED RADIO SYSTEM

This is a continuation of application Ser.No. 07/278,998 filed Dec. 2, 1988 and now abandoned.

BACKGROUND OF THE INVENTION

This invention relates generally to radio communication systems, and more particularly to a repeater for use when a subscriber unit is not in communication with a central station as in trunked radio frequency communication systems.

As disclosed in U.S. Pat. No. 4,723,264, to establish communication between trunked subscriber units, a requesting subscriber unit transmits a call request to a central station (or central controller). Upon receipt of the request, the central station returns a channel grant code (if a channel is available), which instructs the requesting subscriber unit to move to a specified communication channel as a transmitting unit, while causing all called subscriber units to move to the same communication channel as receiving units.

Generally, trunked communication channels comprise a pair of frequencies. An inbound frequency carries information from the subscriber units to the central station, while the outbound frequency carries information from the central station to the subscriber units. Subscriber units may be portable, mobile or fixed. A portable unit is typically understood to be a transceiving device designed to be carried on or about the person. A mobile is a transceiving device designed to be installed in vehicles. A fixed station is typically a permanent or semi-permanent installation in a building or another fixed site. As used herein, all of these transceiving devices are collectively referred to as subscriber units.

One situation where a subscriber unit is not in communication with a central station occurs when the subscriber unit is operating at such a distance (or range) from the central station that the subscriber unit has insufficient power to transmit to the central station; even though the more powerful central station's tansmission can reach the subscriber unit. In this area of weak signal strength, the subscriber unit is out-of-range. Usually, the weak signal strength zone is located in a remote or rural area, where there are very few subscribers present to utilize the system. Therefore, it is not economically to install a conventional repeater or another central station.

One approach is to provide more than one conventional repeater at each weak signal strength area in a simulcast system to amplify all the channels in the coverage area. However, simulcast overlap problems such as intermodulation interferences may occur.

As illustrated in U.S. Pat. No. 4,677,687, one solution pertaining to mobile units involves installing or operating a repeater between the central station and the mobile units to selectively relay information on a booster channel. When the mobile unit detects a weak signal, the mobile unit automatically switches to a predetermined booster channel for communication with the repeater, which will relay the communication to the central station and (and vice versa). This approach requires that each of the mobile units be capable of recognizing the necessity to switch to the booster channel. Generally, for cost efficiency, intalling an economical repeater is preferred over recalling and changing existing units in the field.

Even though the central station generally has more power to tramsmit than the subscriber unit, beyond a certain distance at a fixed power level, the central station will have insufficient power to reach the subscriber unit, especially if the unit roams farther out-of-range. Here, the central station has insufficient communication range for efficient system operation. Therefore, an inexpensive roaming coverage may be needed in some systems as in a trunked specialized mobile radio (SMR) system. Likewise for a system where the central station is located far away from a building, it is desirable to extend the distance the central station can transmit to facilitate communication coverage anywhere within the building.

SUMMARY OF THE INVENTION

Accordingly, it is an object of the present invention to provide an inexpensive repeater without simulcast overlap problems to know when it is needed to extend the coverage range of a central station and/or a subscriber unit by an automatic activation or the like.

Basically, a repeater is provided for relaying communication between a subscriber unit and central station when the repeater recognizes transmission from the subscriber unit to the central station, but detects a lack of response by the central station to that subscriber unit. This aspect of the present invention will extend the coverage range of the subscriber unit operating at such a distance as to have insufficient power to transmit to the central station (out-of-range subscriber unit).

In another aspect of the invention, when a central station has insufficient coverage range to transmit to the subscriber unit, a repeater is provided for relaying communication between the subscriber unit and the central station. When the repeater recognizes a transmission from the subscriber unit requesting the repeater for service, the repeater asks the central station for a channel upon which to communicate. Alternately, a predetermined channel may be used for the relayed communication.

DESCRIPTION OF THE PREFERRED EMBODIMENT

Figure 1:
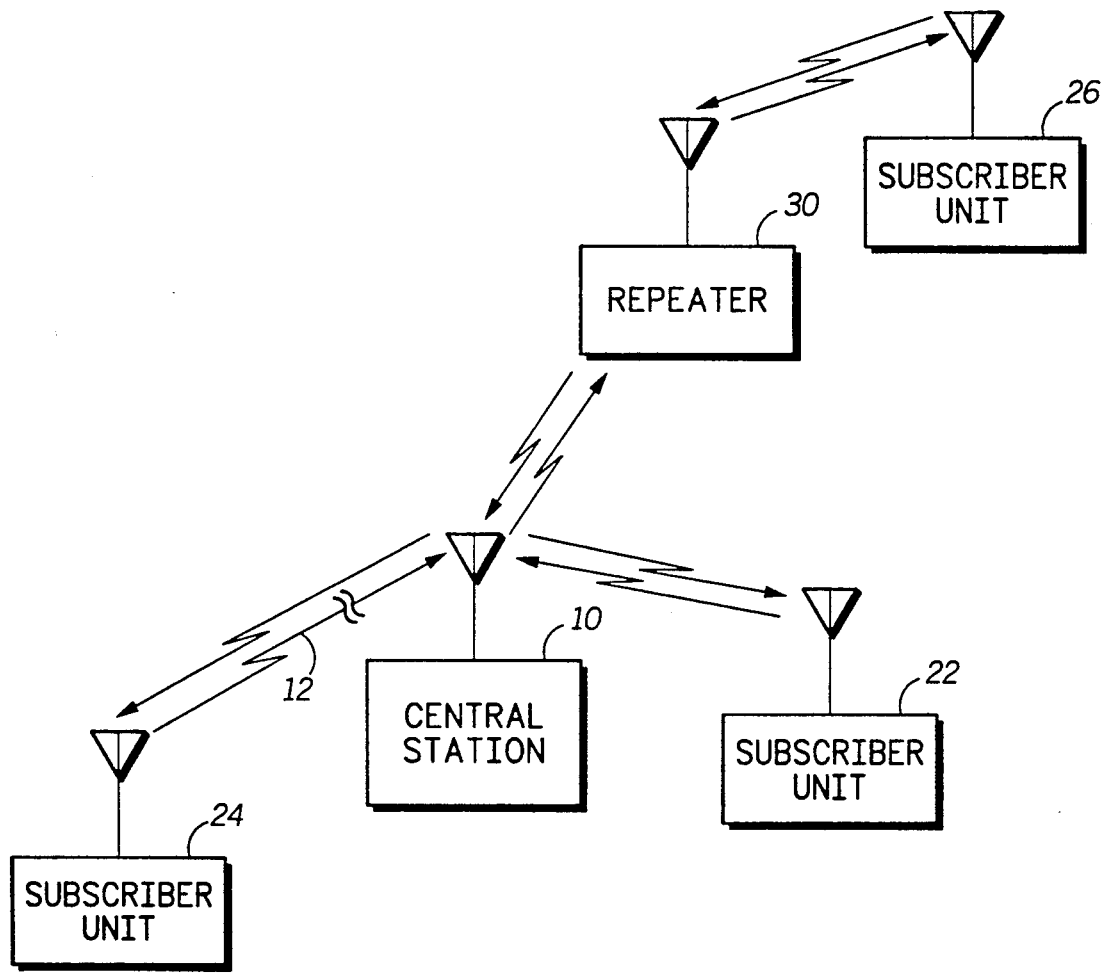
FIG. 1 is a block diagram of a communication system utilizing a repeater in accordance with the present invention.

Referring to FIG. 1, a communication system utilizing a repeater in accordance with the present invention is illustrated. A central station 10 is utilized in conjunction with a plurality of subscriber units 22, 24, and 26. The central station 10 preferably comprises a central controller and a plurality of repeaters, which form the fixed equipment of a trunked radio frequency communication system. Subscriber unit 22 is shown operating at such a distance as to have sufficient power to transmit directly with the central station 10. Ordinarily, the central station 10 has enough power to transmit to the subscriber unit 24, but the subscriber unit 24 is shown operating at such a distance or at such a low power that it has insufficient power to transmit back (12) to the central station 10. Additionally, subscriber unit 26 is shown at a range further away from the central station 10 than that of subscriber unit 24. Therefore, central station 10 and subscriber unit 26 are shown mutually not having sufficient power to transmit to each other. To extend the coverage range of the central station 10, a repeater 30 is illustrated relaying communications between the subscriber unit 26 and the central station 10.

Figure 2:
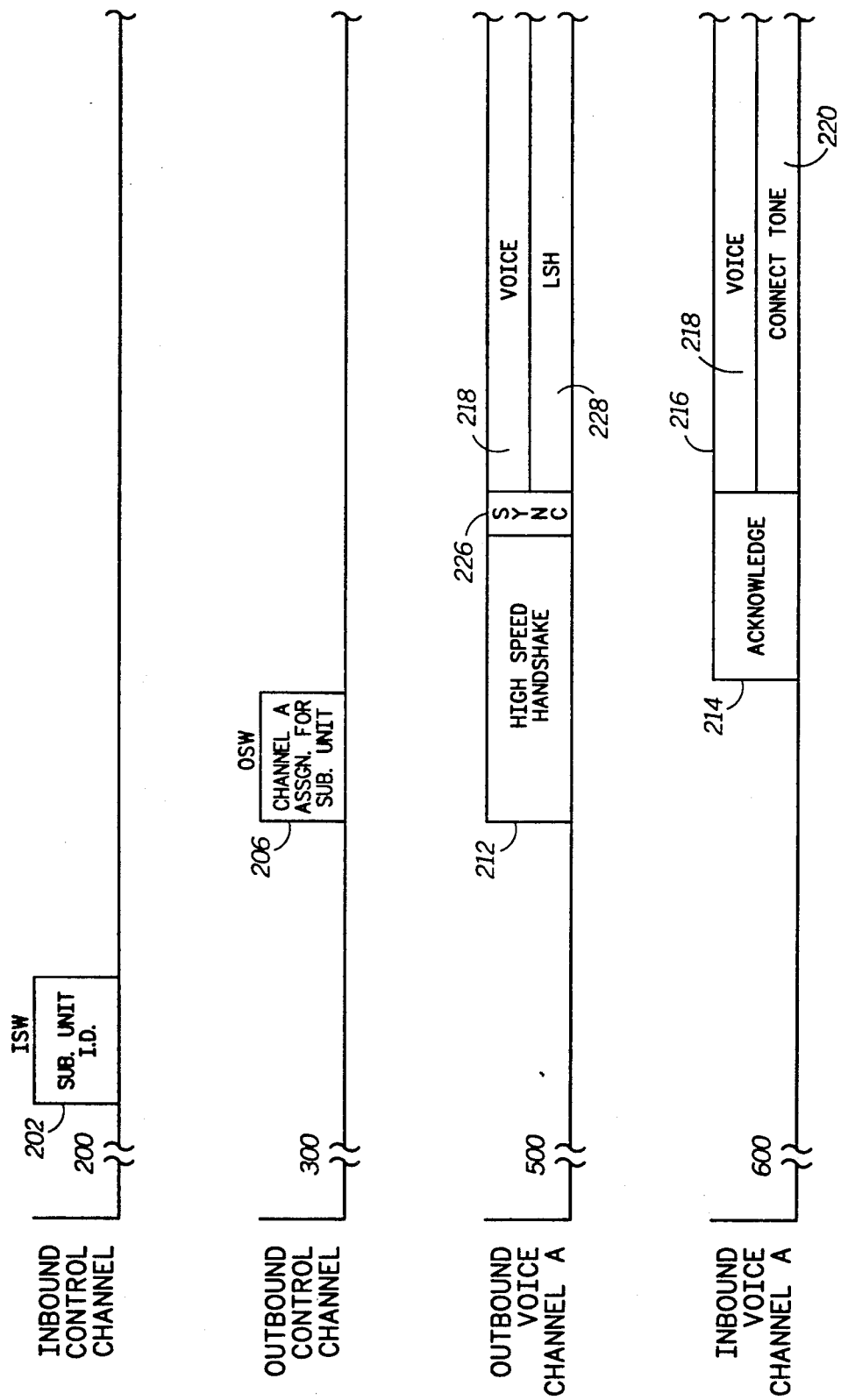
FIG. 2 is an illustration of a protocol of a conventional trunking system.

As is known, the central station 10 receives call requests and transmits channel grants (if a channel is available) and other control and status codes according to a protocol illustrated in FIG. 2. To initiate a call, the subscriber unit 22 transmits to the central station 10 at least one Inbound Signalling Word (ISW) on the inbound control channel 200. The ISW 202 preferably contains at least the ID field of the subscriber unit 22. After processing the call request, the central station 10 returns at least one Outbound Signalling Word (OSW) via the outbound control channel 300. The OSW 206 is a command for the subscriber unit 22 along with other receiving subscriber units to move to a first communication channel (such as a voice channel A). As the subscriber unit 22 switches to the assigned communication channel, a high speed handshake is transmitted on channel A from the central station 10 to be received by the subscriber unit 22 and the receiving subscriber units on the outbound communication channel A (500).

After receiving the highspeed handshake 212, the requesting subscriber unit 22 transmits an acknowledge code 214 to the central station 10. In response, the central station 10 sends a sync word 226 for the receiving and requesting subscriber units. A low speed handshake 228 follows on the outbound communication channel A (500). The requesting subscriber unit 22 subsequently initiates a message 216, which consists of an information signal (for example a voice signal 218) and a connect tone 220, which is used by the central station 10 to maintain the assigned channels as long as the connect tone is received.

At the conclusion of the highspeed handshake 212 and sync 226, the receiving subscriber units receive the message 218 on the outbound communication channel A (500. The message requires the receiving subscriber units to remain on the outbound communication channel A (500) as long as they are receiving the low speed handshake 228. It will be appreciated that the described protocol is an example of a conventional trunking protocol. Other variations may require more or less signalling, or operate with or without two speed handshakes or acknowledgement, etc.

Figure 7:
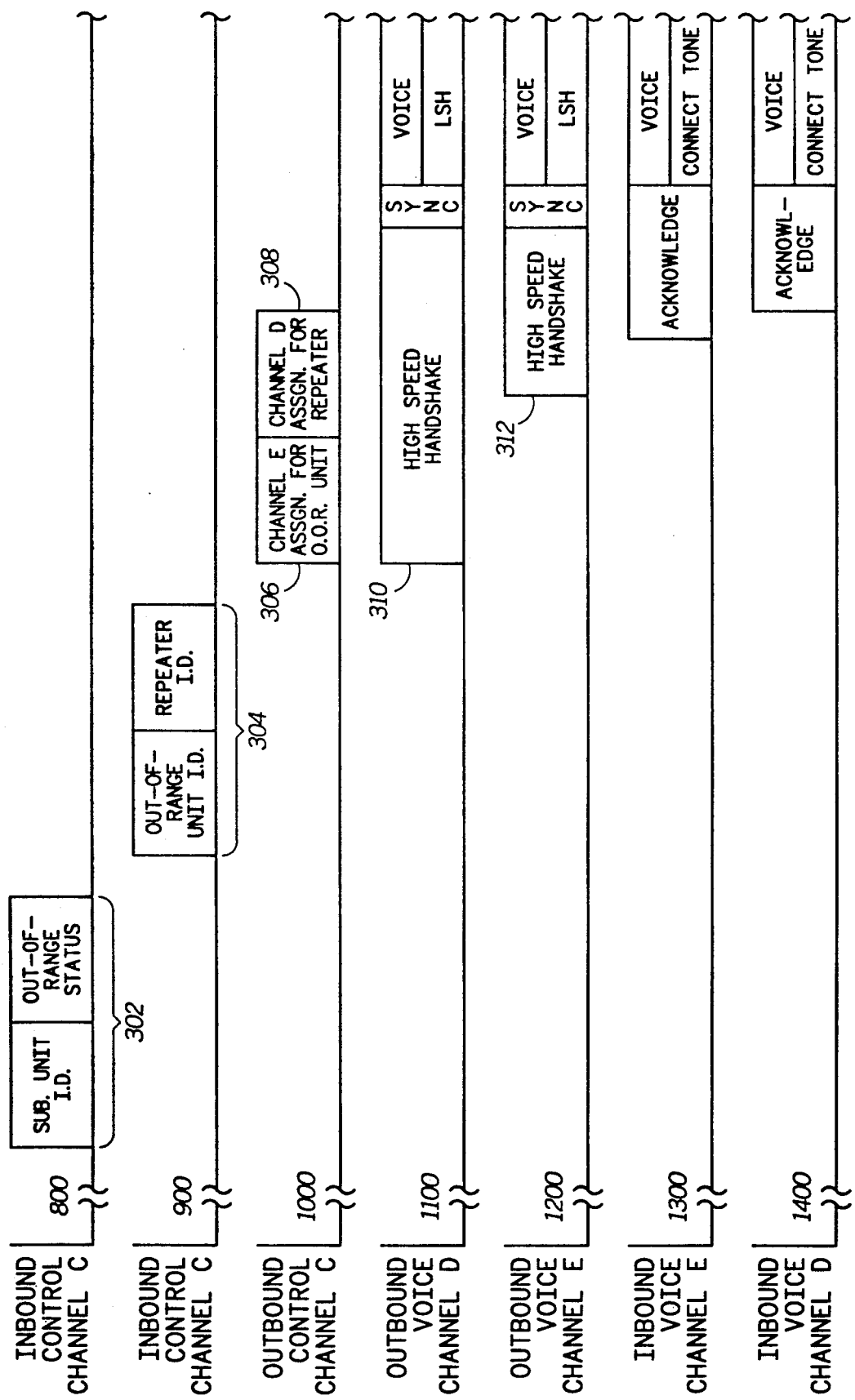
FIG. 7 is an illustration of a protocol for use with the repeater of FIG. 3 when the subscriber unit is operating at such a distance that it can not receive transmissions from the central station.

For use with the present invention, the repeater 30 is substituted for the subscriber unit in processing information to and from the central station 10 as will be further illustrated in FIG.7. According to the invention, the subscriber unit 24 transmits a call request on the inbound control channel to initiate a call. This transmission is monitored by the repeater 30. If the transmission was received by the central station 10, the central station 10 normally returns a channel grant code with the communication channel assignment via the outbound control channel. Without receiving a grant, the subscriber unit 24 continues to re-transmit the call request. However, since the transmission of subscriber unit 24 is out-of-range for its transmission to be received by the central station 10, the repeater 30 receives the retrials of ISW without receiving a corresponding Outbound Signalling Word channel grant from the central staion 10. After a predetermined number of ISW retries have been received without a corresponding OSW, the repeater 30 transmits to the central station 10 a dual Inbound Signal Word sequence. This sequence comprises the first ISW that subscriber unit 24 has been transmitting, and a second ISW indicating that the transmission is being relayed by the repeater 30. Following a proper decode sequence of the dual ISW at the central station 10, the central station 10 responds with two consecutive Outbound Signalling Words (OSWs), which instructs the units being called by the requesting subscriber unit 24 to receive on a second communication channel (designated as B for convenience). Additionally, the repeater 30 is instructed to communicate with the out-of-range subscriber unit 24 on communication channel A (which may be a voice channel), while the repeater 30 communicates with the central station 10 on communication channel B (which may also be a voice channel). The subscriber unit 24 is instructed to transmit on inbound channel A. Subsequently, subscriber unit 24 transmits its message (which may be a voice signal), which is repeated by the repeater 30 and by the central station 10 for reception by the listening subscriber units.

Figure 3:
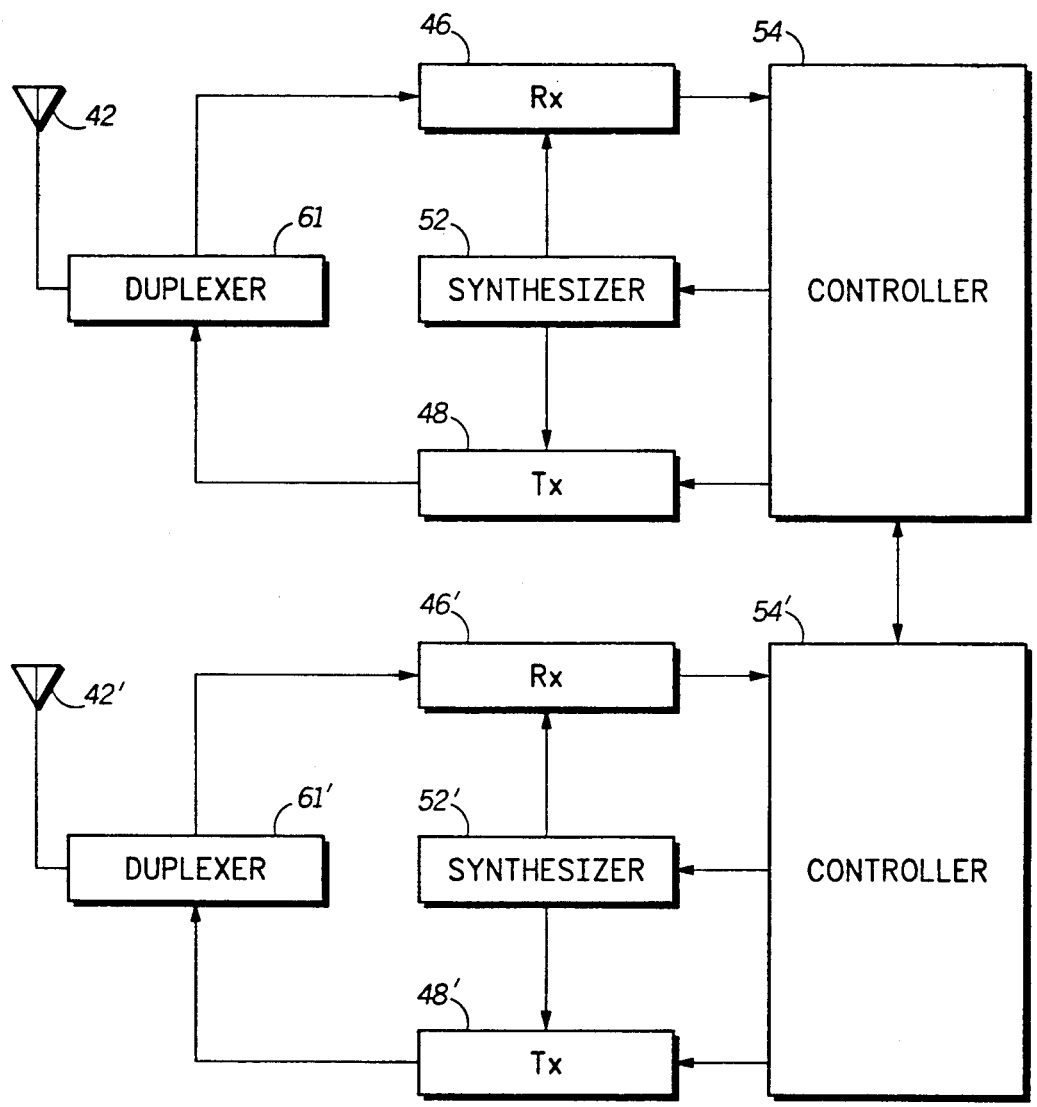
FIG. 3 is a block diagram of the repeater of FIG. 1.

To enable access for more than one subscriber, the repeater may include two full-duplex units as illustrated in FIG. 3. An antenna 42, is coupled via a duplexer 61 to a receiver section 46 and a transmitter section 48 (for receiving ISWs on the inbound control channel and other signals on the inbound communication channel and for transmitting signals on the outbound communication channel, respectively). The synthesizer 52 sets the frequency for the receiver 46 and transmitter 48. The output of the receiver 46 and the input of the transmitter 48 are coupled to a controller 54, which also controls the synthesizer 52. Any well known microprocessor or general purpose computer containing memory may constitute the controller 54. A second controller 54' is coupled to the first controller 54. The other half of the duplex transceiver similarly includes an antenna 42', a duplexer 61', a synthesizer 52', a receiver 46' (for receiving OSWs on the outbound control channel and other signals on the outbound communication channel) and a transmitter 68' (for transmitting ISW on the inbound control channel and other signals on the inbound communication channel). As is known, the duplexers 61, 61' may be replaced by antenna switches to reduce the cost of the repeater.

Figure 4:
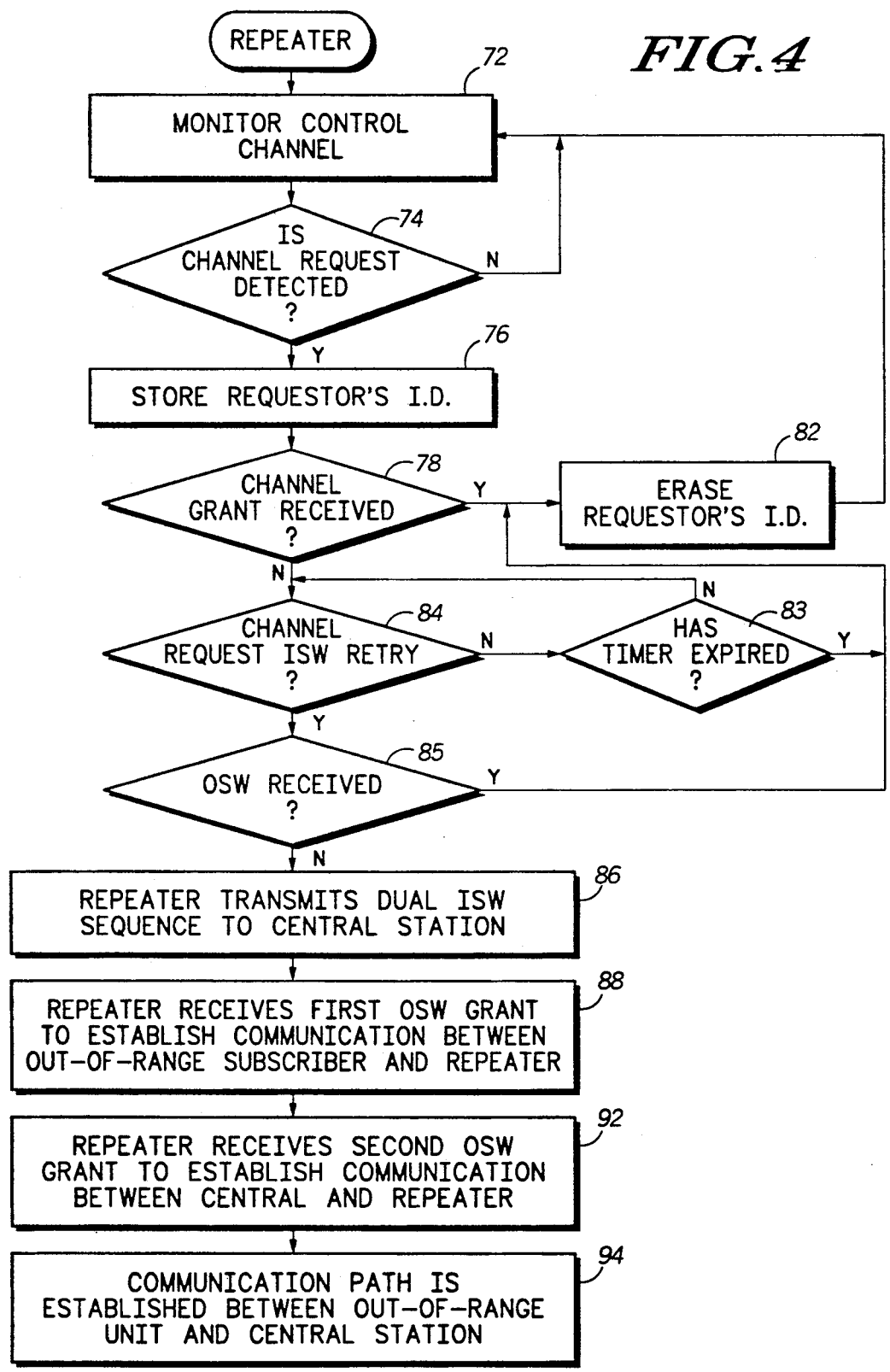
FIG. 4 is a flow diagram illustrating the operation of the trunking repeater of FIG. 3.

The operation of the repeater of FIG. 3 will be described with reference to FIG. 4, which are flow diagrams of the steps executed by the controllers 54, 54' of the repeater 30. These steps are followed when the requesting subscriber unit is out-of-range. Repeater 30 is normally monitoring the control channel at step 72. Decision 74 determines whether a channel request ISW was received from the requesting subscriber unit calling the central station. If no ISW was detected by the receiver 46, the standby monitoring mode of block 72 is maintained. If, however, an ISW has been detected, the requestor's ID is stored at block 76 in a memory portion of the controller 54. Decision 78 determines whether a channel grant code OSW has been transmitted from the central station 10 to the subscriber unit 24. If the OSW has been received by the receiver 46', the requestor's ID is erased from memory at block 82, and the repeater 30 returns to the normal standby monitoring mode of block 72. If, however, an OSW directed to the requesting subscriber unit 24 was not detected in step 78, decision 84 searches for an ISW retry by the subscriber. If no ISW retry occurs within a predetermined time limit (block 83), the requestor's I.D. is erased (block 82), and the repeater returns to its monitoring state, block 72. Alternately, if the ISW retry has been detected at decision block 84, the repeater 30 looks for an OSW directed to the subscriber unit 24 at decision block 85. If an OSW is detected the routine branches back to block 82. If the OSW is not detected, the repeater transmits a dual ISW sequence informing the central station 10 of the IDs of the out-of-range subscriber unit and the repeater, respectively, in block 86 via the transmitter 48'. In response to the central station's grant, the repeater receives the first OSW, at block 88, which determines its receive frequency for receiving communication transmissions from the out-of-range subscriber unit. At block 92 the repeater 30 receives the channel frequency information for relaying the received information signal (which may be a voice signal) to the central station 10. The repeater 30 (at block 94) acting on the information, switches to the assigned frequencies for repeating the communication transmissions of the subscriber unit 24 to the central station 10.

Figure 5:
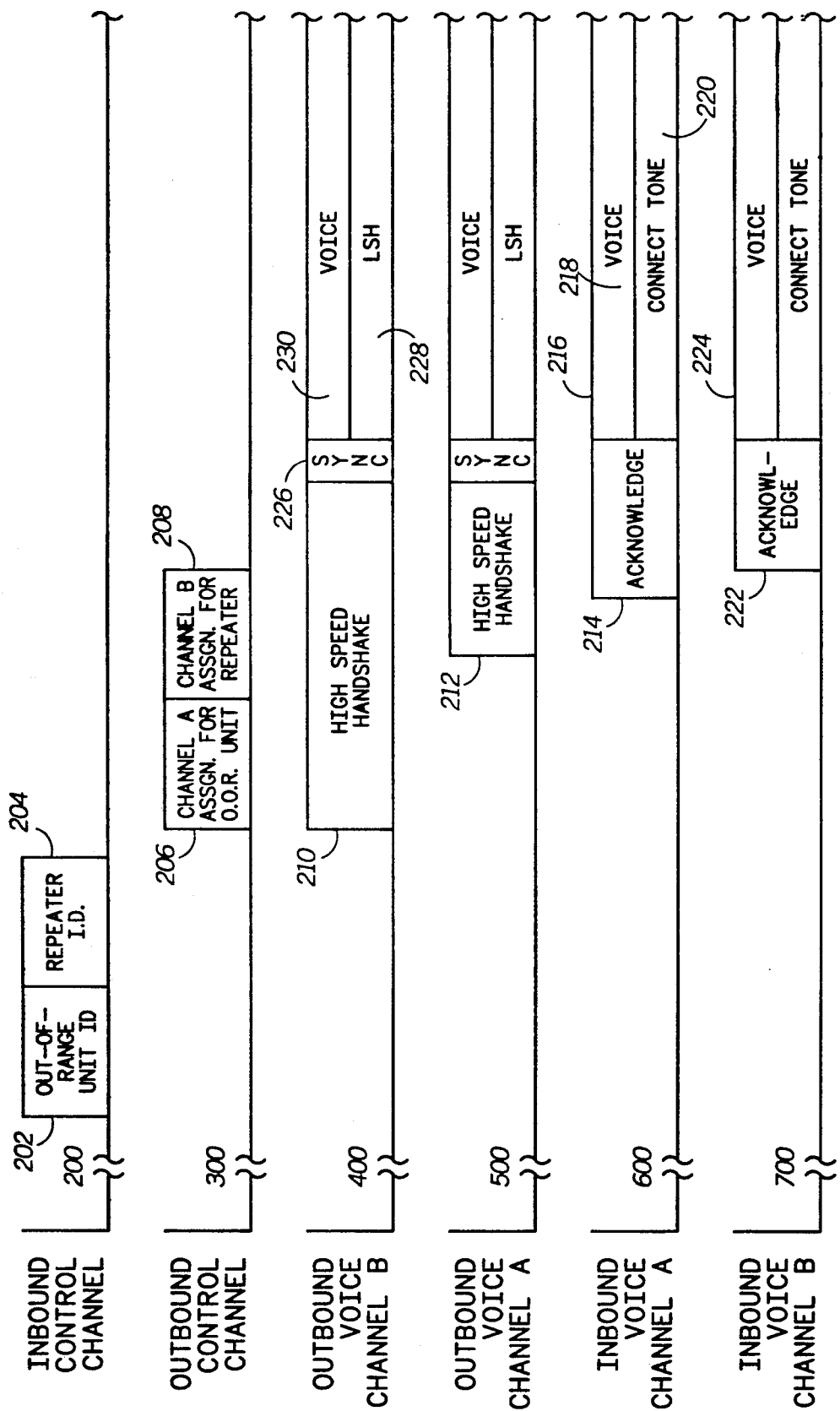
FIG. 5 is an illustration of a protocol of the present invention for use with the repeater of FIG. 3.

Referring to FIG. 5, a signalling protocol of the repeater of FIG. 3 is illustrated when the subscriber unit is operating at such a distance as to have insufficient power to transmit to the central station. When the repeater 30 recognizes a sequence of ISW retrials without an OSW grant to the out-of-range subscriber unit 24, the repeater 30 transmits to the central station 10 a dual ISW sequence on the inbound control channel 200. The first ISW 202 contains at least the ID field of the out-of-range subscriber unit 24 and the second ISW 204 contains at least the ID of the repeater 30. After processing the call request, the central station 10 returns a dual OSW via the outbound control channel 300. The first OSW 206 is a command for the out-of-range subscriber unit 24 and that half of the repeater directed towards the subscriber unit to move to communication channel A. The second OSW 208 commands the other half of the duplex transceiver within the repeater 30 along with other receiving subscriber units in the requesting subscriber unit's group to switch to communication channel B. Simultaneously, the central station 10 generates a high speed handshake code 210 for the receiving subscriber units moving to the outbound communication channel B 400 to receive the highspeed handshake and prepare to receive an information signal. As the out-of-range subscriber unit 24 and the repeater 30 switch to their respective communication channels, the high speed handshake is routed in the repeater 30 (from the receiver 46' set on channel B to transmitter 48 set for channel A) to be received by the subscriber unit 24 on the outbound communication channel A (500).

After receiving the highspeed handshake 212, the requesting subscriber unit 24 transmits an acknowledge code 214. The repeater 30 immediately routes the high speed acknowledge signal 222 on inbound communication channel B (700) (from receiver 46 to transmitter 48') for transmission to the central station 10. In response, the central station sends the sync work 226 for the receiving subscriber units followed by the low-speed handshake 228 on the outbound communication channel B(400). Subsequently, the requesting subscriber unit 24 initiates its message 216, which consists of an information signal (for example a voice signal 218) and a connect tone 220, which is retransmitted by repeater 30 on inbound communication channel B (700) to the central station 10 to maintain the assigned channels 400, 500, 600 and 700 as long as the connect tone is received even if the information signal 216 might cease.

At the conclusion of the acknowledge signal 222 and the highspeed handskake 210 the receiving subscriber units receive the message 224 (same message as in 216) on the outbound communication channel B (700). The message includes the repeated information 230 and the low-speed handshake 228, which requires the receiving subscriber units to remain on the outbound communication channel B (400) while they are receiving the low-speed handshake 228.

Figure 6:
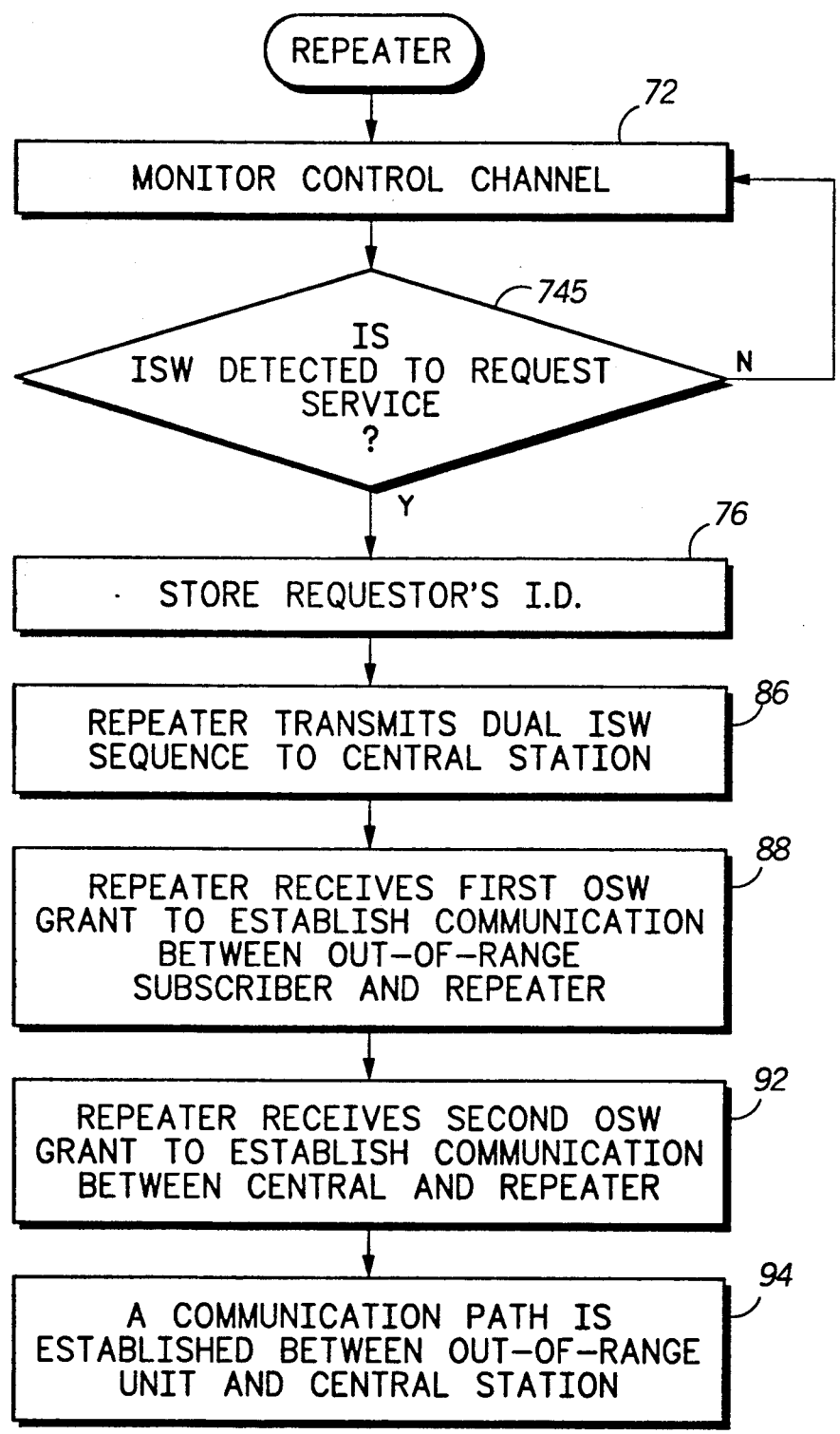
FIG. 6 is a flow diagram for use with the repeater of FIG. 3 when the subscriber unit is operating at such a distance that it can not receive transmissions from the central station.

If the central station has insufficient communication range for efficient system operation such that it cannot directly transmit to the subscriber unit 26, the repeater of FIG. 3 follows the steps for the controllers 54,54' in the flow diagram of FIG. 6. When the subscriber unit 26 stops receiving from the central station 10, it transmits a requesting service ISW to the repeater 30 to relay its transmissions and receptions. Repeater 30 is normally in the stand-by mode of block 72, monitoring the control channel. Decision 745 determines whether a repeater service request ISW was received from the subscriber unit 26. If no service request ISW was detected by the receiver 46 the standby monitoring mode of block 72 is maintained. If, however, a service request ISW has been detected, the requestor's ID is stored at block 76 in a memory portion of the controller 54. Subsequently, the repeater transmits via the transmitter 48', a dual ISW sequence informing the central station 10 of the IDs of the subscriber unit and of the repeater, respectively, in block 86. After the central station processes the information, the repeater receives the first OSW from the central station, at block 88, which determines the repeater's receive frequency for receiving communication transmissions from the subscriber unit 26. At block 92 the repeater 30 receives the channel frequency information for transmitting the received information signal to the central station 10. Alternately, if a specific channel has been predetermined for use by the repeater 30, steps 86, 88, and 92 are bypassed. Step 94 follows to establish communication with the subscriber unit 26 and the central station 30 on that predetermined channel.

FIG. 7 is an illustration of a protocol for use with the repeater of FIG. 3 when the central station needs range extension since it has insufficient communication range for efficient system operation. Once the subscriber unit 26 stops decoding the outbound control channel, it sends a dual ISW 302 on the last inbound control channel C (800) to advise the pre-assigned repeater that the subscriber unit 26 cannot receive from the out-of-range central station. In response, the repeater 30 asks the central station 10 for a channel assignment 304 for itself and the subscriber unit on inbound control channel C (900) as in FIG. 7. After receiving and processing the request 304, the central station 10 transmits a channel E assignment 306 for the subscriber unit and the half of the repeater 30 communicating with the subscriber unit and the channel D assignment 308 for the other half of the repeater 30 and the rest of the subscribers on outbound control channel C (1000). Once there is a call for the out-of-range unit then, repeater 30 immediately routes the High Speed Handshake (HSH) 310 on the outbound control channel D (1100) from the receiver 46' to the transmitter 48 for transmission on the outbound communication channel E (1200) as HSH 312. Alternately, the repeater 30 may have a predetermined channel assigned for its use and will not need to follow the channel requesting protocol. However, regardless of how the channel is assigned, the subscriber unit 26 scans through a list of possible channels for wide area coverage where channel E is included. Once the subscriber unit decodes the HSH 312 from the repeater, the subscriber unit acknowledges and operates on the correct channel during the remainder of the conversation.

I claim as my invention:

1. A fixed repeater for facilitating communication between a subscriber unit and a central station when said subscriber unit is located in a zone of weak signal strength wherein direct communication between said central station and said subscriber unit cannot occur, comprising:
receiver means for receiving signals transmitted by said subscriber unit and said central station;
transmitter means for transmitting signals to said subscriber unit and said central station; and
control means, responsive to received signals, for recognizing a transmission representing at least a call request from said subscriber unit to said central station, and an absence of a channel grant from said central station in response to said transmission representing at least said call request from said subscriber unit, wherein said fixed repeater repeats transmissions between said subscriber unit and said central station by utilizing said receiver means and said transmitter means for transmitting signals to said subscriber unit and said central station.

2. A fixed repeater for facilitating communication between a central station and a subscriber unit, said subscriber unit having transmitting means to request service of said repeater, comprising:
monitoring means in said fixed repeater for receiving signals from said subscriber unit on a first channel;
receiver means for receiving a signal requesting said repeater to repeat transmissions between said subscriber unit and said central station transmitted by said subscriber unit on said first channel; and
control means responsive to said signal request of repeater service to relay transmissions between said subscriber unit and said central station by switching to an assigned channel already designated for said fixed repeater.

3. A method for a repeater to facilitate communication between a subscriber unit and a central station, comprising the steps of:
(a) receiving in said repeater signals transmitted by said subscriber unit;
(b) receiving in said repeater signals transmitted by said central station;
(c) controlling operation responsive to received signals for recognizing transmission from said subscriber unit to said central station, and a lack of response by said central station to said transmission from said subscriber unit, wherein said repeater automatically transmits a signal representing a call to said central station;
(d) receiving in said repeater a signal representing an answer from said central station wherein said step (d) comprises receiving a message representing at least a channel assignment from said central station, and switching to assigned channels for communication with said subscriber unit and said central station in response to said channel assignment; and
(e) operating to repeat transmissions between said subscriber unit and said central station.

4. A method for a fixed repeater to facilitate communication between a subscriber unit and a central station, comprising the steps of:
(a) monitoring in said fixed repeater signals received from said subscriber unit on a first channel;
(b) receiving a request of repeater service signal transmitted by said subscriber unit on said first channel wherein said request of repeater service signal being received in step (b) comprises a signal requesting said repeater to repeat transmissions between said subscriber unit and said central station being received; and
(c) operating thereafter, to relay transmissions between said subscriber unit and said central station by switching itself to an assigned channel already designated for said fixed repeater.

5. A method for a repeater to facilitate communication in a communication system between a subscriber unit and a central station, comprising the steps of:
(a) monitoring in said repeater signals received from said subscriber unit on a first channel;
(b) receiving a request of repeater service transmission from said subscriber unit on said first channel requesting said repeater to repeat transmissions;
(c) switching itself to at least one system predetermined channel for communication with said subscriber unit and said central station in response to said request of repeater service transmission;
(d) scanning by said subscriber unit to determine said at least one predetermined channel; and
(e) repeating transmissions from said subscriber unit and said central stations on said at least one system predetermined channel.

6. A method for a repeater to facilitate communication between a subscriber unit and a central station via at least one control channel and at least one communication channel, comprising the steps of:
(a) monitoring in said repeater a message representing at least a call request from said subscriber unit to said central station on said control channel;
(b) monitoring in said repeater a message representing at least a channel assignment from said central station to said subscriber unit on said control channel;
(c) detecting an absence of said message representing at least a channel assignment from said central station and at least another message representing at least a call request from said subscriber unit on said control channel;
(d) transmitting a message representing at least a call request to said central station in response to step (c) on said control channel;
(e) receiving in said repeater a signal representing an assignment from said central station on said control channel for said subscriber unit to communicate with said repeater on a first communication channel and for said repeater to communicate with said central station on a second communication channel; and (f) repeating transmissions between said subscriber unit and said central station.

7. A method for a repeater to facilitate communication in a communication system between a subscriber unit and a central station via at least one control channel and at least one system predetermined communication channel, comprising the steps of:

monitoring, in said repeater, signals received from said subscriber unit on said control channel;

receiving a signal requesting said repeater to repeat transmissions between said subscriber unit and said central station from said subscriber unit on said control channel;

switching to said at least one system predetermined communication channel for communication with said subscriber unit and said central station in response to said signal requesting said repeater to repeat transmissions between said subscriber unit and said cental station; and repeating transmissions between said subscriber unit and said central station.

8. In a trunked communication system having at least one central controller for allocating a limited number of communication channels among a plurality of subscriber units and each subscriber unit having at least an individual identification code, said subscribers constructed and arranged to communicate information on any of the communication channels, a method for a repeater having at least an individual identification code to initiate communication between any of the plurality of subscribers and said at least one central controller comprising the steps of:

(a) receiving in said repeater a first message from said subscriber unit comprising at least a call request information word representing said subscriber unit's identification code;

(b) receiving in said repeater a second message from said central controller representing said subscriber unit's identification code and a channel assignment;

(c) determining whether said second message from said central controller has been received before receiving a predetermined number of said first messages from said subscriber comprising at least said call request;

(d) transmitting a third message to said central controller representing said subscriber's individual identification code and said repeater's identification code, in response to receiving a predetermined number of said first messages from said subscriber unit before receiving said second message from said central controller; and (e) receiving in said repeater a fourth message from said central controller comprising at least channel grant information words each representing a channel assignment for said subscriber to communicate with said repeater, and a channel assignment for said repeater to communicate with said central controller and other subscriber units.

9. In a trunked communication system having at least one central controller for allocating a limited number of communication channels among a plurality of subscriber units and each subscriber unit having at least an individual identification code, said subscriber unit constructed and arranged to communicate information on any of the communication channels, said communication channels includes a plurality of designated channels, a method for a repeater having at least an individual identification code to provide communication between any of the plurality of subscriber units requesting access to said repeater and said at least one central controller comprising the steps of:

at said subscriber unit:
(a) transmitting a message to said repeater comprising at least a call request information word being organized in fields, wherein a first field represents said subscriber's individual identification code, and a second field represents a status code when a signal ceases to be received from said central station;

(b) scanning through said plurality of designated channels for reception of a signal representing a handshake on one of said plurality of designated channels;

(c) transmitting a signal representing an acknowledgement when said handshake has been received on one of said plurality of designated channels;

at said repeater:
(a) receiving said message from said subscriber unit comprising at least a call request information word representing said subscriber's individual identification code and said status code;

(b) transmitting a message to said central controller comprising at least a call request information word representing said subscriber's individual identification code and said repeater's identification code;

(c) receiving a message from said central controller comprising at least channel grant information words each representing a channel assignment for said subscriber to communicate with said repeater, and a channel assignment for said repeater to communicate with said central controller and other subscriber units;

(d) transmitting said signal representing said handshake to said subscriber unit on said one of said plurality of designated channels;

(e) receiving said signal representing said acknowledgement from said subscriber unit on said one of said plurality of designated channels.

10. The method of step 9, wherein step (c) at said repeater comprises the step of switching to an assigned channel already designated for said repeater.

* * * * *